United States Patent

Harding

[11] Patent Number: 6,116,155
[45] Date of Patent: Sep. 12, 2000

[54] MELON PEELER

[75] Inventor: Gary John Harding, Scarness, Australia

[73] Assignee: Univex Corporation, Salem, N.H.

[21] Appl. No.: 09/177,371

[22] Filed: Oct. 23, 1998

[30] Foreign Application Priority Data

Oct. 23, 1997 [AU] Australia .................................. PP0004

[51] Int. Cl.⁷ .................................................. A23N 7/00
[52] U.S. Cl. .............................. 99/541; 99/584; 99/585; 99/587; 99/589; 99/590; 99/594
[58] Field of Search ............................. 99/539–541, 567, 99/584–586, 587–592, 623–630; 426/481–483

[56] References Cited

FOREIGN PATENT DOCUMENTS

B-14998/88  9/1990  Australia .
B-43547/89  3/1992  Australia .

*Primary Examiner*—Timothy Simone
*Attorney, Agent, or Firm*—Hoffman, Wasson & Gitler

[57] ABSTRACT

An apparatus for removing skin from a convex surface of a section of fruit. The apparatus includes a curved peeling blade which presents a concave peeling surface to the convex surface of the section of fruit and a drive gear wheel in mesh with an idler gear wheel. Each wheel has a concentric outwardly extending fruit gripping portion which are profiled such that in combination they conform to the curved peeling blade. When the drive wheel is driven and the wheels are rotating, the fruit gripping portions grip a section of fruit and urge the section of fruit past the peeling blade so as to remove the skin from the fruit.

12 Claims, 5 Drawing Sheets

MELON PEELER

BACKGROUND OF THE INVENTION

The present invention relates to an improved apparatus for peeling fruit and in particular relates to an apparatus for peeling melons.

Machines which automatically peel stone fruit and in particular mangoes are known. An example of such a machine is described in Australian Patent No. 602073. This machine has a curved peeling blade, which conforms to the concave outer surface of the mango. The mango is first halved and seeded and then transported by conveyor belt towards the peeling blade. The mango is urged past the peeling blade by means of an overhead profiled belt. Slicing blades are associated with the curved blade to both slice the mango and to guide the mango half through the peeling blade. However, such an arrangement is unsuitable if it is desirable for the fruit to be peeled as a single piece rather than slices. For example, slices are typically unsuitable for further processing in dicing machines.

The distance through which the centerline of the fruit skin moves as it passes through the peeling blade is greater than the distance moved by the edges of the skin. However, the profiled belt and roller arrangement as described in AU602073 moves fastest at the edges of the skin and slowest at the centerline. In practices this difference in travelling speeds causes uneven feeding of the fruit past the blade and/or jamming of the fruit in the machine.

Another mango peeling machine, described in Australian Patent No 621411, employs a similar curved peeling knife. However, a pair of counter rotating traction wheels are used to urge the mango past the knife. Each wheel has a rim profiled to conform to the shape of the peeling blade. The distance between the rim and the knife controls the peeling depth. The rims are adapted to grip the skin of a piece of mango, which is being fed by a conveyor toward the rotating wheels. When the mango reaches the wheels, it is gripped by the rims and urged downwards through the peeling blade. Use of the profiled rims enables the different speeds of the centerline and edges of the mango as it travels through the peeling blade to be accommodated.

The machines as described above are operated by electric motors which operate chain or belt drives. However, such drive systems are expensive to fabricate, install and align. Regular maintenance and servicing is also required. Further, after a period of time, the chain or belt and respective guides become worn and/or loose. In the case where the peeling machine has a pair of counter rotating wheels, the chain drive is subject to wearing and stretching. When such wearing and stretching occurs, the fruit may be gripped in an uneven manner by the wheel rims. This causes the fruit being to be fed to peeling blade in an uneven or skewed manner. This results in non-uniform peeling of the fruit.

Another disadvantage of the above machines, is that the size of the drive mechanisms require a relatively large housing. This means that the size of the machine prevents its application in the domestic kitchen or smaller spaces such as a restaurant or cafe. Another feature of the known machine which makes it unsuitable for these applications is that the drive mechanisms generate considerable noise.

OBJECT OF THE INVENTION

It is therefore an object of the present invention to provide an improved apparatus for peeling fruit such as melons, which may at least partially overcome the above disadvantages or provide the public with a useful choice.

BRIEF DESCRIPTION OF THE PRESENT INVENTION

According to a first broad form of the invention there is provided an apparatus for removing skin from fruit, the apparatus including a peeling blade and a pair of meshing gear wheels mounted for rotation, such that rotation of said wheels urges the fruit past said blade so as to remove the skin from the fruit.

The apparatus of the present invention may be used for removing the skin of any suitable fruit. In particular the apparatus is suitable for peeling melons. The apparatus may be used for peeling precut sections of fruit. Preferably the apparatus removes skin from a fruit half.

The apparatus of the present invention includes a peeling blade. The peeling blade is typically curved and presents a concave cutting peeling surface to the convex shape of a curved half of a section of fruit such as a melon or avocado half. In some cases it may be desired for the fruit to have a decorative edge. The peeling blade may therefore have a zigzag or other decorative type of edge. where the apparatus is to be used for removing the skin from melons, preferably the knife further includes an inner curved blade concentric with the first blade. In use, the inner blade separates the seed sac of the melon from the flesh.

Typically, the fruit approaches the knife horizontally, the fruit meets the counter rotating wheels and is forced to change direction such that it passes downwards through the peeling blade In order to provide a uniform cut it is preferred that the fruit describes an arc as it is peeled. In order to facilitate such arcuate passage, it is preferred that the peeling blade has a convex cross section.

The apparatus of the invention also includes a pair of meshing gear wheels. The gear wheels typically have a 1:1 ratio and preferably have an outwardly extending concentric fruit gripping portion which contacts and grips the fruit skin. Preferably the fruit gripping portion is profiled to conform to the shape of the curved peeling blade. The blade is generally located on the same plane as the axis of the wheels. Typically the distance between the blade and the fruit gripping portion corresponds to the depth of peel removed from the fruit. Preferably, this distance is able to be varied.

The gear wheel and front fruit gripping portion may be integrally formed. Alternatively the fruit gripping portion may be formed separately. The fruit gripping portion may be attached to the gear wheel and mounted to the shaft. The fruit gripping portion and gear wheel may also be separately mounted to the shaft. The fruit gripping portions may thus be interchangeable to accommodate different fruits or fruits of different sizes.

The gear wheel may be made from any suitable material. Preferably the gear wheels and teeth are integrally moulded from a food grade thermoplastics material. Preferably the plastics material and tooth profile are selected to minimise operational noise.

Preferably the front fruit gripping portions of the wheels are adapted so as to improve the grip on the fruit skin. The front face of the wheel may be roughened, textured and/or include a number of projecting gripping teeth or pins. In a preferred form of the invention, the projections on the wheels are angled such that they grab the fruit skin at an acute angle. The projections may also be curved inwardly to facilitate a grabbing action with the fruit skin.

The fruit may be fed to the wheels either by hand or on a conveyor belt. The gear wheels may be driven by any suitable means for driving a gear wheel. For example, the shaft of the driven gear wheel may be directly driven by an electric motor. Alternatively, the driven wheel may be driven by a worm gear meshing with the gear teeth of the gear wheel. The gear wheel may also be adapted for manual rotation. The drive shaft may be directly or indirectly attached to a handle or the like which may be manually rotated by a user. Alternatively, the gear wheel may be operated by a further gear wheel, which is adapted for manual operation.

The above arrangement enables the size of the machine to be reduced by enabling the bulky drive mechanism to be removed. However, in some circumstances such as small domestic kitchens, it is desirable to be able to decrease the overall size of the machine still further.

According to a second broad form of the invention there is provided an apparatus for removing skin from fruit, the apparatus including a peeling blade, a feeding means for feeding, the fruit past the blade so as to separate the skin from the flesh of the fruit and at least one fruit guide roller for guiding the fruit past the blade.

The apparatus of the second broad form of the present invention includes both a feeding means and a guide roller. The feeding means is typically located such that in use it contacts the fruit skin at about the center-line thereof. As the center-line moves faster than the edges, the driving means controls the speed at which the fruit is urged past the peeling blade. The at least one guide roller is typically located such that in use it contacts an edge of the fruit. Preferably, there is at least one pair of guide rollers located on opposite sides of the blade. The guide roller is thus able to rotate at the same speed as the edge of the skin. In this way the fruit may be guided in an even manner past the blade.

The presence of the guide roller enables the size and shape of the drive means to be varied whilst still providing for an even feeding of the fruit past the peeling blade. This is because it is no longer necessary for the drive means to satisfy the requirements that a) the feeding means contacts the entire section of the fruit skin, as it is being pushed past the blade, and b) the respective parts of the feeding means move at different speeds to accommodate the different speeds ok the center and edges of the fruit skin.

The feeding means may be in the form of a pair of opposed profiled meshing wheels However, the heads may be made with a smaller diameter such that only about the center of the skin is contacted by the heads The edges of the skin are contacted by the guide roller(s). As the heads are a smaller size, it enables the size of the apparatus to be reduced still further. However, it should be appreciated that the use of the guide roller is not restricted to an apparatus having a pair of meshing heads as described in the first broad form of the invention. The feeding means may also be in the form of smaller counter rotating heads operated by a conventional drive belt. The drive means may also be a single overhead roller or profiled conveyer. In this case again, only that portion about the center-line of the fruit skin need be contacted by the feeding means.

DETAILED DESCRIPTION OF THE PREFERRED EMBODIMENTS

Figure 1:
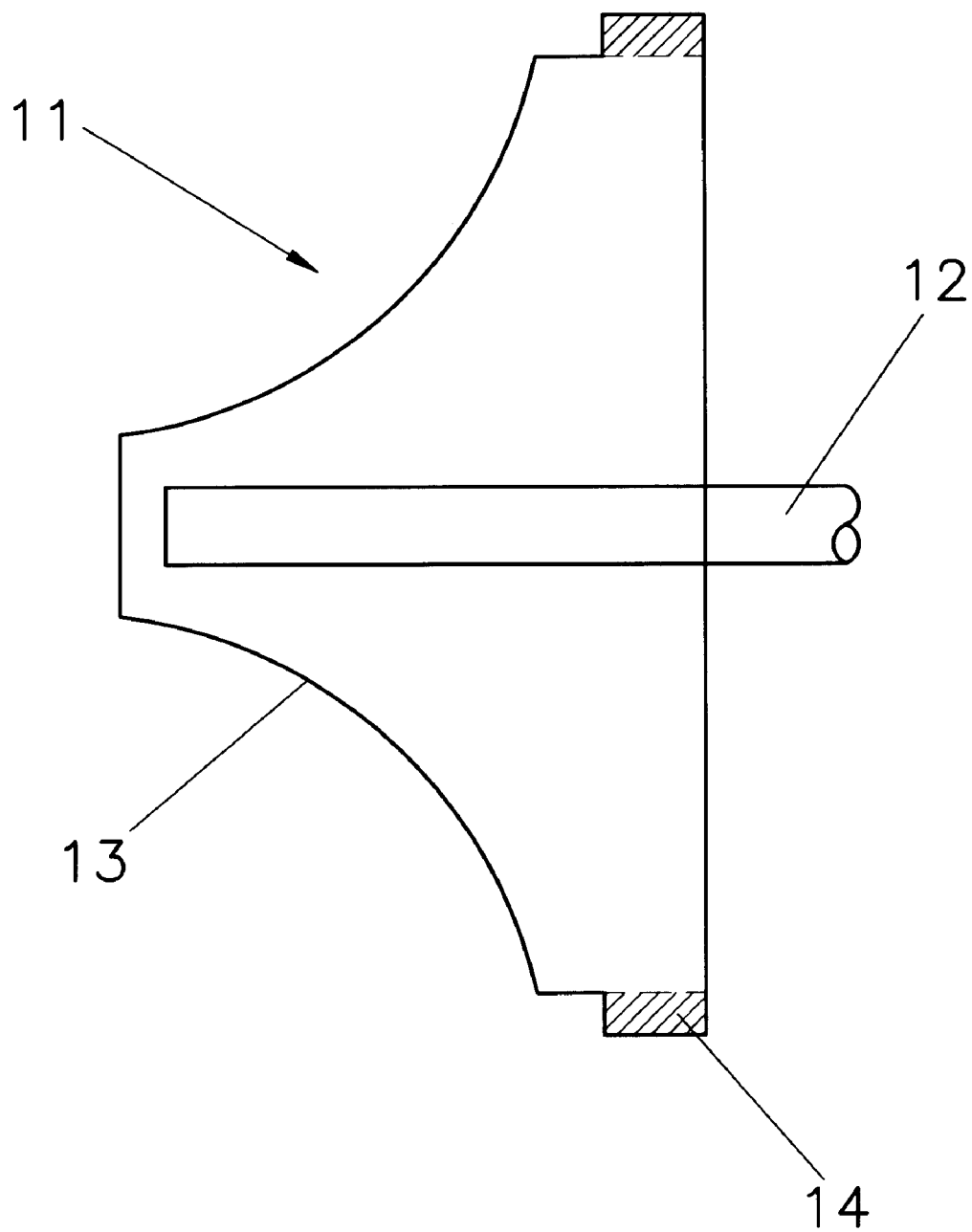
FIG. 1 illustrates a cross sectional side view of a preferred gear wheel for use in a preferred apparatus of the present invention.

FIG. 1 illustrates the cross section of a gear wheel 11 for use in a peeling apparatus of the present invention. The wheel 11 is attached to a shaft 12. This shaft is driven by an electric motor (not illustrated). The wheel has a frustoconical front face 13. The front face has a number of protruding stainless steel studs (not illustrated). The studs facilitate gripping of the fruit skin. The circumference of the wheel has a number of gear teeth 14. The wheel is formed by injection moulding and the teeth are integrally moulded. The stainless steel studs may be molded into the wheels during the injection moulding process. The studs are preferably angled towards the fruit skin. The studs may also be at least partially curved towards the skin so as to facilitate the grip thereon.

Figure 2:
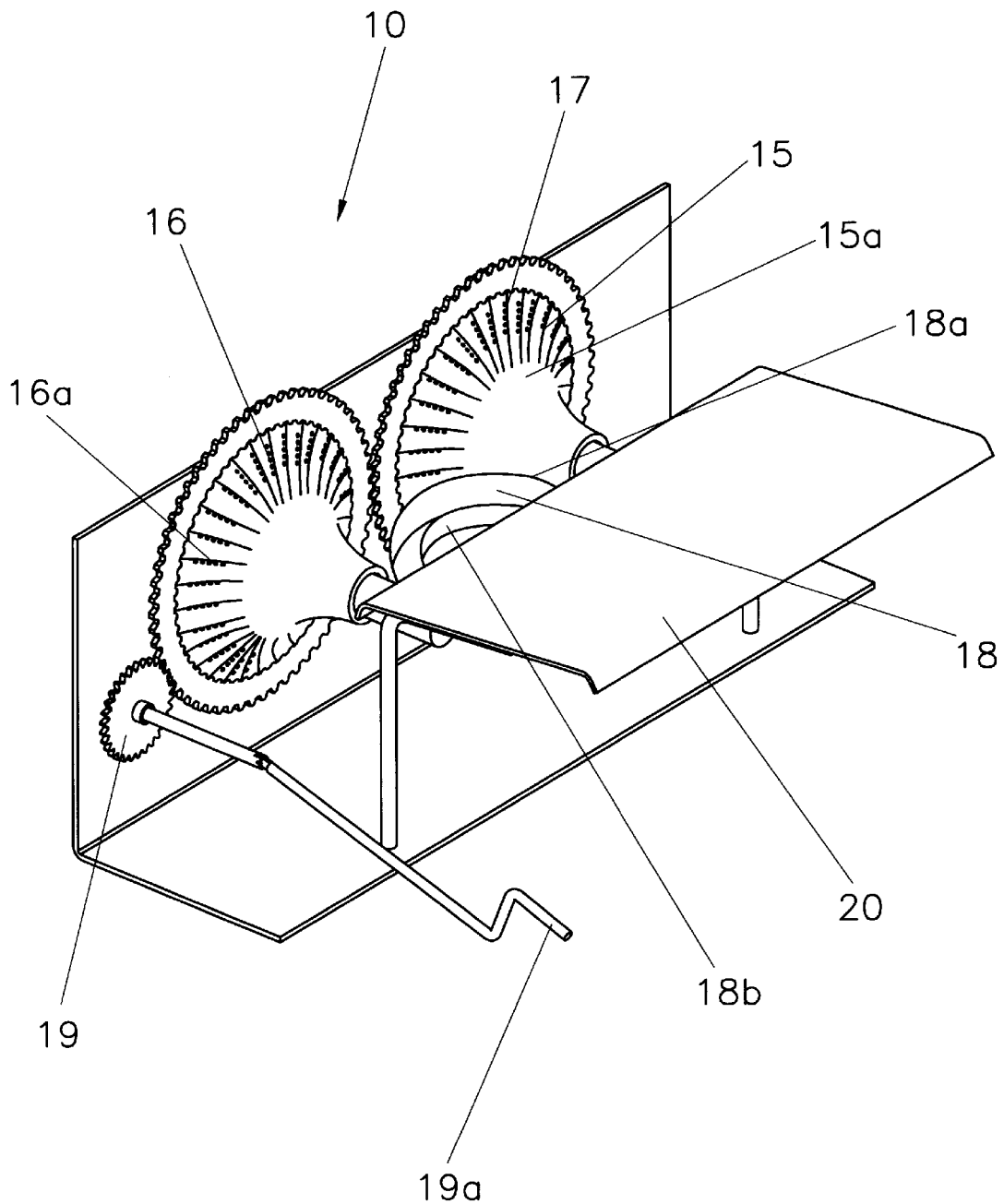
FIG. 2 illustrates a perspective view of a preferred apparatus of the present invention.

FIG. 2 illustrates a perspective view of a preferred apparatus 10 of the present invention. The apparatus includes a pair of gear wheels 15, 16. Each wheel has an outwardly extending frustoconical front face 15a, 16a. Each face has a plurality of radically aligned pins 17 extending from the base portion thereof. A curved peeling knife 18 is located between the wheels. The peeling knife has an outer blade 18a and an inner blade 18b. The plane of the peeling knife 18 is at about the same level as the line intersecting the axes of wheels 15, 16. The faces 15a, 16a are profiled such that in combination they conform to the curvature of the blade 18a. The distance between blade 18a and the curved faces corresponds to the depth of the skin to be cut away. This distance may be varied if desired. In use, the outer blade 18a cuts the skin from the fruit and the inner blade 18b separates the seed sac from the fruit flesh.

The wheels 15, 16 have a ratio of 1:1. This means that at the closest point between the two wheels, the circumference of each wheel is travelling in the same direction and at the same rotational velocity. This enables each wheel to grip opposing sides of the fruit skin at the same time and velocity. Thus, each side of the fruit can be uniformly pulled towards the peeling blade. This provides a cleaner cut and also prevents a non-symmetrical cut, uneven peeling or damage to the face of the peeled flesh.

Figure 3:
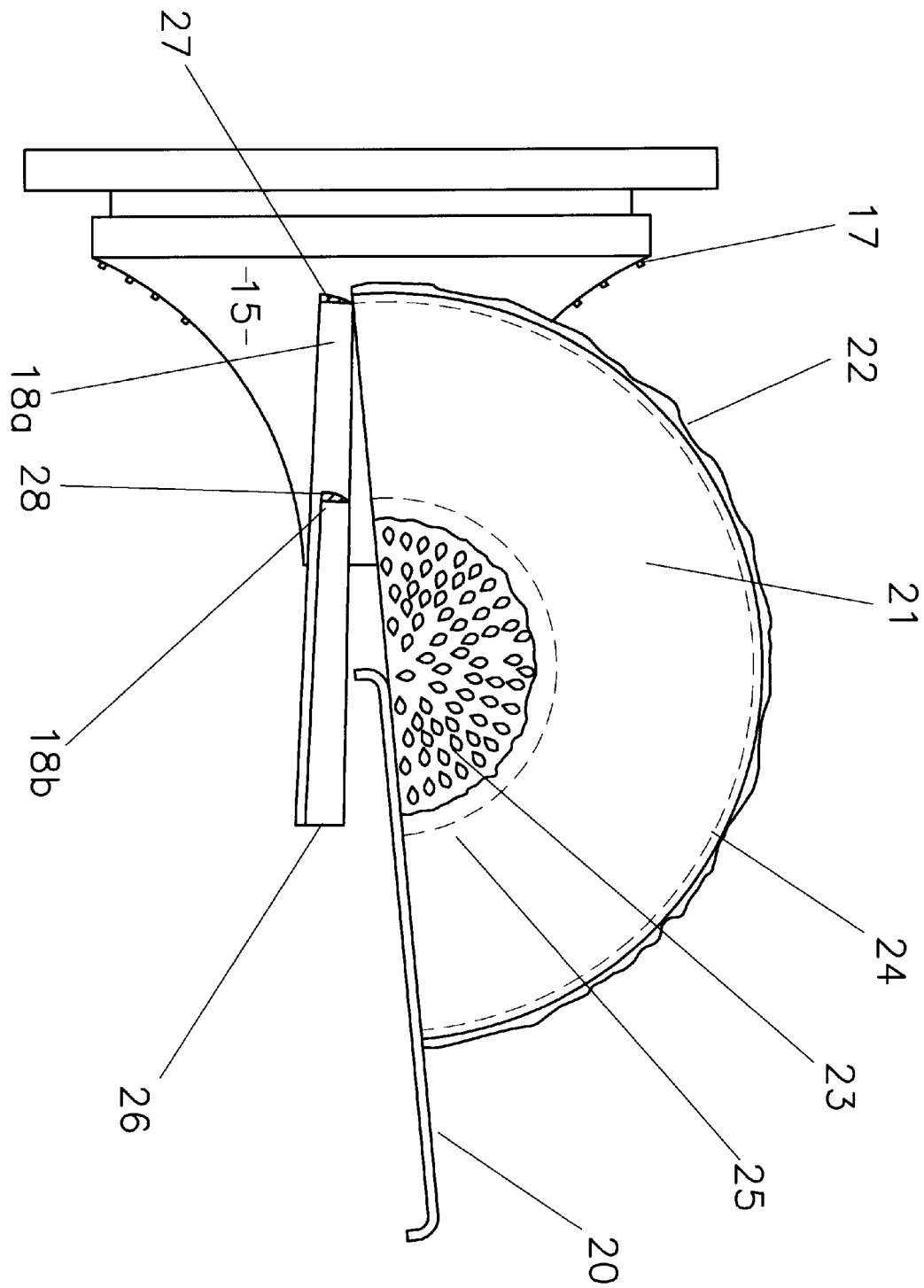
FIG. 3 illustrates a cross section of the apparatus of FIG. 2 in use.

The apparatus also includes a further gear wheel 19. This gear wheel is adapted to permit hand operated cranking of the wheels 15, 16 by rotation of handle 19a. The gear wheel 19 may also be driven by an electric motor. Alternatively, wheel 15 may have a set of female gear teeth moulded into the rear face which receives a gear wheel The apparatus further includes a flat feed plate 20 located in front of the gear wheels and at approximately the same level as the line extending horizontally between the line intersecting the axes of the wheels. FIG. 3 is a cross section of the apparatus of FIG. 2 in use removing the skin 22 from a melon half 21. The melon half 21 is placed on the feed plate 20 and pushed towards the wheels 15, 16 by hand or other means. The pins 17 grab the melon at about the centerline thereof and force the melon though the peeling blades 18a and 18b so as to separate the skin and seed sac therefrom. Dotted lines 24, 25 indicate where the respective blades cut the melon. The blades taper away from the non-cutting edge. This tapered shape enables the blades to slice more easily through the fruit flesh than conventional non-tapered blades. The faces 27, 28 of the blades have a concave surface which is profiled to approximate the curvature of the passage of the fruit about the blade. This curvature further facilitates the scooping action of the blade through the flesh Conventional peeling blades as described in AU 602073 are typically constructed from a rectangular length of stainless steel which has been bent to shape and the upper cutting edge sharpened. The present inventor has observed that such blades are prone to jamming of the fruit between the blade and the wheels. Such jamming in particular occurs towards the completion of the peeling cycle. The flat blade edge is attempting to slice through a fruit section of small radius. Often the flat blade edge catches the fruit at this stage. When jamming occurs it is necessary to cease rotation of the wheels and remove the jammed fruit manually. A chute (not illustrated) is provided beneath the blade to catch the peeled fruit. The chute is preferably placed to guide the peeled fruit section from the knife to a receiving chamber. The present inventor has observed that in the absence of a chute or other guiding means that towards the end of the peeling action, the weight of the fruit causes the fruit to bend under its own weight. Such bending may be minimized or avoided by provision of a chute or other guiding means. This may lead to a nonuniform cut or jamming of the fruit.

Figure 4:
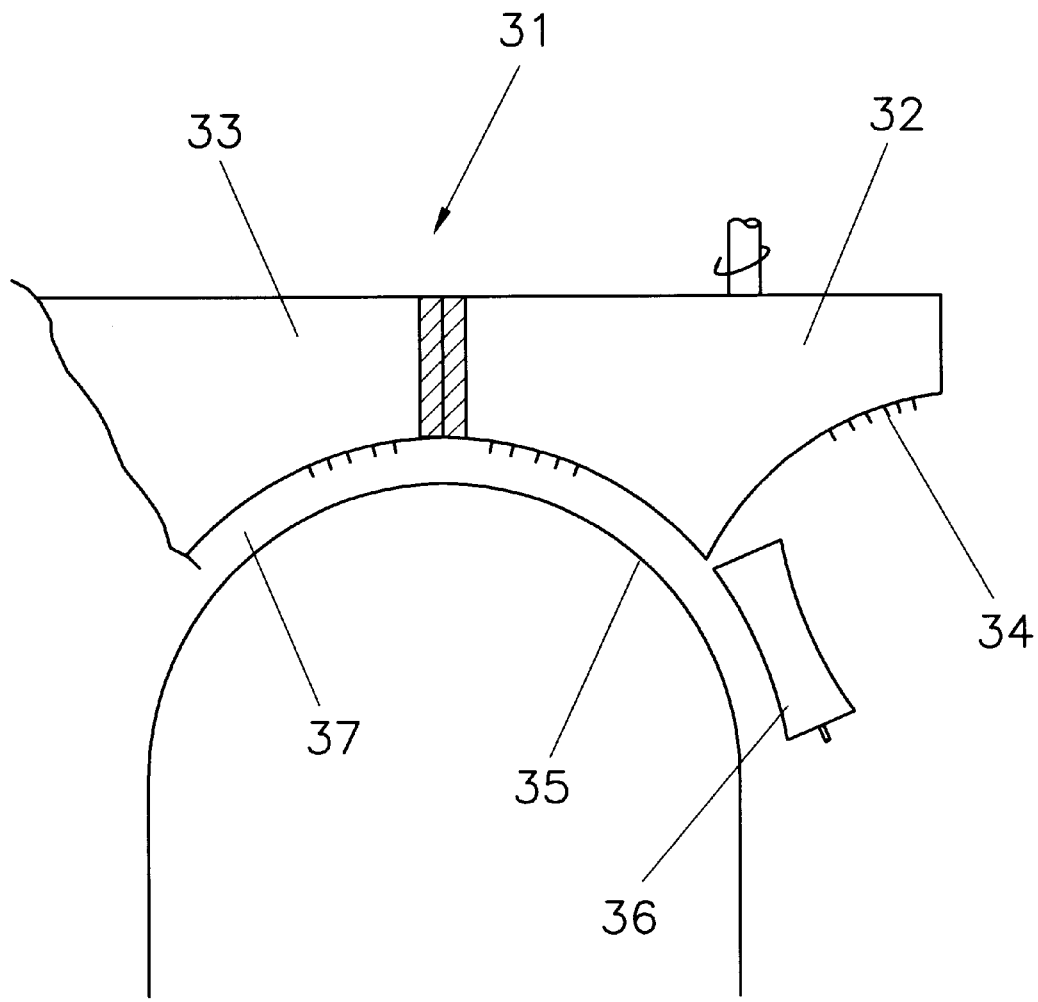
FIG. 4 illustrates a cross sectional plan view of a further preferred apparatus of the present invention.

FIG. 4 is a plan view in cross section of a further preferred apparatus 31 of the invention. The apparatus has a pair of gear wheels 32, 33. Each gear wheel 32, 33 has a conical front face and studs 34 extending therefrom. The apparatus includes a curved peeling knife 35. The gear wheels are similar in shape and method of construction as that described above with reference to FIG. 1. The difference between the wheels 32, 33 are that wheels 32 and 33 are of a smaller diameter and the front face does not extend along the full length of the curved portion of the knife 35. This means that the shafts of the wheels may be placed closer together than otherwise possible.

The apparatus further includes a pair of guide rollers 36 located on either side of the knife (only one roller is illustrated). The guide roller 36 has an outer concave surface which is complimentary to the knife 35. The distance 37 between the guide roll 36 and the knife 35 and wheel 32 and the knife 35 is the same. This distance corresponds to the depth of the cut of the knife beneath the skin. The single roller 36 illustrated may be replaced by two or more rollers if desired.

In use a fruit half is urged towards the counter rotating wheels in a similar manner as described above. The studs 34 grab the skin and push the fruit past the knife 35. Only the center portion of the fruit is grabbed by the wheels. The edges of the fruit are guided past the knife by the rollers 36. The rollers are idle, which means that they can rotate at a speed corresponding to the relevant section of fruit skin. The speed at the rollers is slower than the speed of the center of the fruit. This ability of the guides to rotate at the same speed as the respective section of fruit minimizes the likelihood of the fruit jamming. Jamming may occur where the guides are stationary with respect to the movement of the fruit. In this way the slipping or skewing of the fruit is minimized or avoided.

It can be seen that by being able to reduce the size of the wheels the overall size of the apparatus may be significantly reduced.

Figure 5:
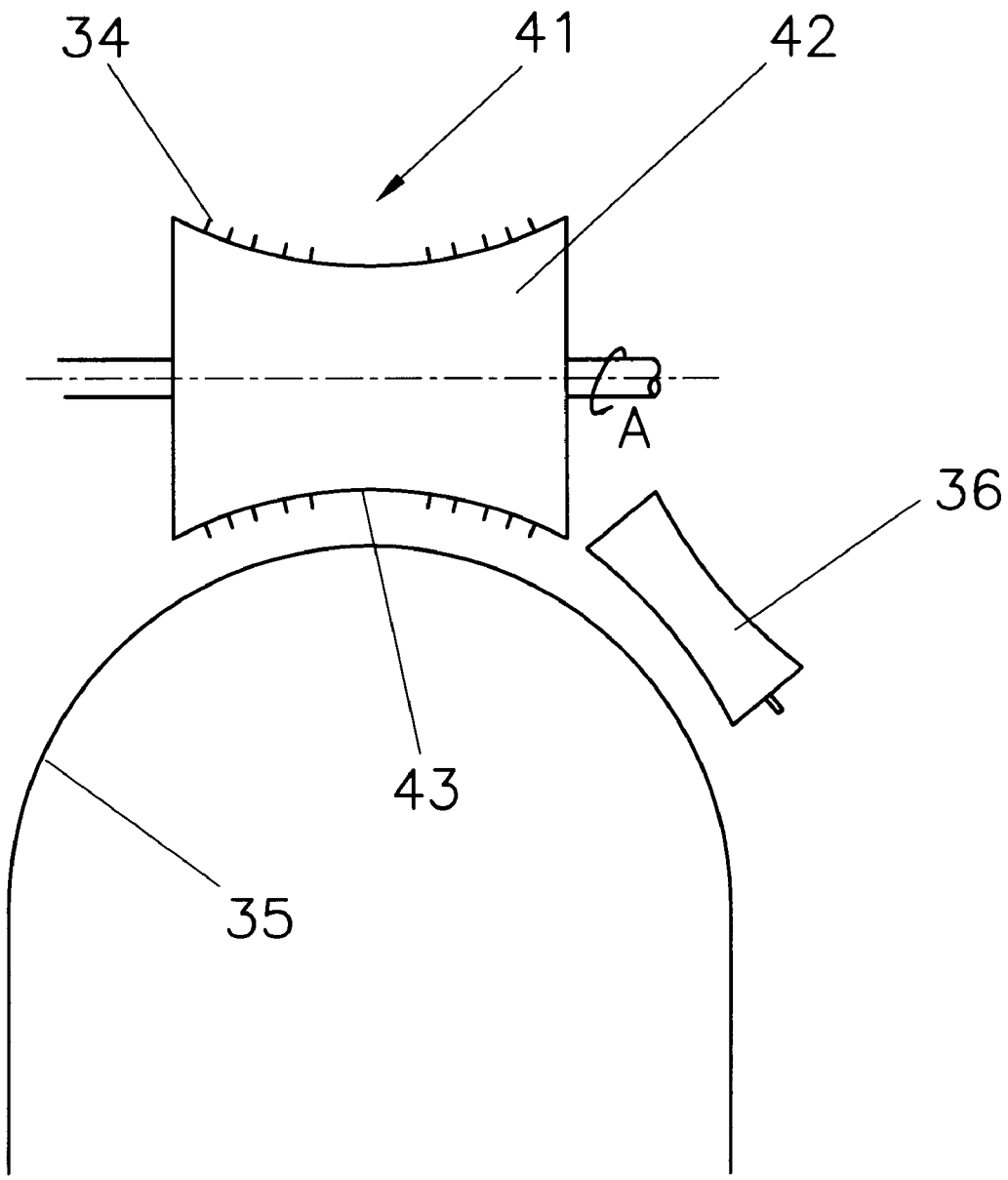
FIG. 5 illustrates a cross sectional plan view of a preferred embodiment of the second broad form of the invention.

FIG. 5 illustrates a further preferred apparatus 41 according to the second broad form of the invention. The apparatus includes a curved peeling knife 35 and opposed guide rollers 36 similar to that illustrated in FIG. 4. (Again only one roller is illustrated). The two wheels have been replaced by a single curved roller 42, which rotates in the direction of arrow A. The roller 42 has a concave face 43 which is complementary to the curvature of the knife 35. The roller may be operated by an electric motor or by hand.

The apparatus operates in a similar manner to that described above in that the wheel grabs the fruit about its centerline and pushes it past the knife 35. The edges of the fruit are guided by the rollers 36. As the rollers rotate freely, they roll at the same speed as the fruit edges which is slower than the centerline of the fruit. In this way the fruit is not skewed or pulled and may be fed evenly over the knife.

It can be seen that the preferred apparatus of the present invention has some advantages over the known chain drive operated machines. First, the apparatus does not have a bulky chain drive. This enables the size of the housing for the device to be substantially reduced. This makes it possible to produce a fruit peeler suitable for use in a commercial or domestic kitchen area. This has hitherto been impossible with the earlier known machines. Further, the apparatus of the present invention does not require the regular servicing and maintenance which was necessary for the chain drives. Further, chains have been observed to stretch after a period of use. When this occurs, there is an uneven rotation of the roller heads. This causes a significant increase in drive noise and also one half of the fruit is gripped momentarily before the other half and the fruit is unevenly fed to the blade. In the apparatus of the present invention in which the fruit is urged towards the blade by meshing gears, the problems of uneven feeding may be avoided.

The apparatus of the present invention may also conveniently be manufactured as a manually operated machine. A manually operated machine is suitable for use in a domestic kitchen. Preferably, the gear wheels are easily removable from the shafts to facilitate cleaning and storage. This enables the machine to be used for domestic or other uses where a full scale industrial or electrically powered machine is unsuitable.

It can also be seen that the apparatus of the second broad form of the invention can enable the overall size of the apparatus to be reduced even further. The apparatus may use two smaller wheels (which need not be meshed), a single roller or conveyer. The apparatus also enables the driving mechanism to be simplified.

It should be appreciated that various other changes and modifications may be made to the embodiments described without departing from the spirit and scope of the invention.

I claim:

1. Apparatus for removing skin from a section of fruit having a convex surface, said apparatus comprising a curved peeling blade which has a concave cutting shape with respect to the fruit surface, a drive gear wheel in mesh with an idler gear wheel, each wheel having a concentric outwardly extending fruit gripping portion, the fruit gripping portions being profiled such that in combination they conform to at least a section of the concave shape of the peeling blade, whereby when said drive wheel is driven so as to rotate the gear wheels, said fruit gripping portions are able to grip the fruit and urge the fruit past the peeling blade so as to remove the skin from the fruit.

2. The apparatus of claim 1, wherein said fruit gripping portions including a plurality of fruit gripping projections.

3. The apparatus of claim 1, wherein said drive gear wheel is adapted to be driven manually.

4. The apparatus of claim 3, which further includes a worm gear in mesh with the drive gear wheel.

5. The apparatus of claim 3 which further includes a feed plate for feeding the fruit towards the wheels.

6. The apparatus of claim 1, which further includes at least one fruit guide roller located at a position opposed to the curved peeling blade for guiding the section of fruit past said peeling blade.

7. The apparatus of claim 6, wherein said at least one fruit guide roller is concave so as to conform to opposing shape of the peeling blade.

8. An apparatus for removing skin from fruit, the apparatus including a U-shaped peeling blade and a pair of meshing gear wheels mounted for rotation, an outwardly extending fruit gripping portion located on the face of each wheel wherein when said wheels are rotated the fruit gripping portions of each respective wheel are able to grip the fruit and urge the fruit past the blade so as to remove the skin from the fruit.

9. The apparatus of claim 8, wherein the peeling blade has a concave cutting face, with respect to the fruit surface.

10. The apparatus of claim 9 wherein the pair of meshing gear wheels each have a concentric outwardly extending fruit gripping portion which are profiled such that in combination, they conform to at least a section of the concave shape of the peeling blade and one of the pairs of meshing gear wheels is a drive gear wheel which in use, is driven to rotate the gear wheels such that said fruit gripping portions are able to grip the fruit and urge the fruit past the peeling blade so as to remove the skin from the fruit.

11. An apparatus for removing skin from fruit, the apparatus including a U-shaped peeling blade, a fruit feeding means for gripping the fruit and feeding the fruit past the peeling blade, the feeding means including a single roller having a concave face and which is located opposing the peeling blade at about the apex thereof and at least one guide roller for guiding the fruit past the curved peeling blade.

12. The apparatus of claim 11, wherein said at least one fruit guide roller is concave so as to conform to the opposing shape of the U-shaped peeling blade.

* * * * *